US011840828B2

(12) United States Patent
Seggio et al.

(10) Patent No.: US 11,840,828 B2
(45) Date of Patent: Dec. 12, 2023

(54) FAUCET ASSEMBLY WITH INTEGRATED ANTI-SCALD DEVICE

(71) Applicant: AS America, Inc., Piscataway, NJ (US)

(72) Inventors: Francis A. Seggio, Wayside, NJ (US); Hsiao Chang Li, Edison, NJ (US); Anthony D'Amato, Warren, NJ (US)

(73) Assignee: AS America, Inc., Piscataway, NJ (US)

( * ) Notice: Subject to any disclaimer, the term of this patent is extended or adjusted under 35 U.S.C. 154(b) by 0 days.

(21) Appl. No.: 17/690,939

(22) Filed: Mar. 9, 2022

(65) Prior Publication Data

US 2022/0195708 A1 Jun. 23, 2022

Related U.S. Application Data

(63) Continuation of application No. 16/181,076, filed on Nov. 5, 2018, now Pat. No. 11,280,072, which is a (Continued)

(51) Int. Cl.
*G05D 23/13* (2006.01)
*E03C 1/04* (2006.01)
(Continued)

(52) U.S. Cl.
CPC .............. *E03C 1/041* (2013.01); *E03C 1/04* (2013.01); *E03C 1/0412* (2013.01); *F16K 11/076* (2013.01); *F16K 11/0856* (2013.01); *F16K 17/38* (2013.01); *F16K 31/002* (2013.01); *G05D 23/022* (2013.01); *G05D 23/13* (2013.01);
(Continued)

(58) Field of Classification Search
CPC .... F16K 31/002; G05D 23/02; G05D 23/021; G05D 23/022; G05D 23/13; G05D 23/1306; G05D 23/132; G05D 23/1326; G05D 23/134; G05D 23/1346; G05D 23/1353; E03C 2001/026
See application file for complete search history.

(56) References Cited

U.S. PATENT DOCUMENTS 2,235,651 A 3/1941 Frank
3,921,659 A 11/1975 Rudewick, III
(Continued)

FOREIGN PATENT DOCUMENTS

CN 101568756 A 10/2009
CN 201944335 U 8/2011
(Continued)

OTHER PUBLICATIONS

DE 2917233 (English translation) (Year: 1988).*
(Continued)

*Primary Examiner* — Jonathan Bradford
(74) *Attorney, Agent, or Firm* — Morrison & Foerster LLP

(57) ABSTRACT

Fluid supply assemblies for fluid systems are provided, including faucet assemblies (e.g., electrically or mechanically actuated faucet assemblies) having an integrated anti-scald device and having an integrated temperature mixing valve. An exemplary faucet assembly includes an integrated temperature mixing valve, and/or an integrated anti-scald device configured to stop the inlet flow of hot water in the event the mixed outlet water temperature exceeds a user-selected set point. The faucet assemblies can prevent scalding as defined by ASSE 1070.

18 Claims, 11 Drawing Sheets

Related U.S. Application Data continuation of application No. 15/153,818, filed on May 13, 2016, now Pat. No. 10,119,253.

(51) Int. Cl.
| | |
|---|---|
| *G05D 23/02* | (2006.01) |
| *F16K 11/076* | (2006.01) |
| *F16K 17/38* | (2006.01) |
| *F16K 11/085* | (2006.01) |
| *F16K 31/00* | (2006.01) |
| *E03C 1/02* | (2006.01) |

(52) U.S. Cl.
CPC ..... *G05D 23/1313* (2013.01); *G05D 23/1353* (2013.01); *E03C 2001/026* (2013.01)

(56) References Cited

U.S. PATENT DOCUMENTS

| | | | |
|---|---|---|---|
| 5,011,074 | A | 4/1991 | Kline |
| 5,141,153 | A | 8/1992 | Jeffress |
| 5,647,530 | A | 7/1997 | Lorch |
| 6,042,015 | A | 3/2000 | Eveleigh et al. |
| 2003/0234295 | A1 | 12/2003 | Mace |
| 2007/0000547 | A1* | 1/2007 | Cochart ............. G05D 23/1346 137/614.2 |
| 2014/0261781 | A1 | 9/2014 | Dolgos |

FOREIGN PATENT DOCUMENTS

| | | |
|---|---|---|
| CN | 103511667 A | 1/2014 |
| CN | 205155161 U | 4/2016 |
| DE | 2917233 A1 | 11/1979 |
| EP | 0461562 A2 | 12/1991 |
| WO | 03/085474 | 10/2003 |
| WO | 2006/040456 A1 | 4/2006 |

OTHER PUBLICATIONS

International Search Report and Written Opinion dated Sep. 14, 2017, directed to International Application No. PCT/US2017/032258; 19 pages.

Invitation to Pay Additional Fees mailed Jul. 18, 2017, directed to International Application No. PCT/US2017/032258; 13 pages.

Seggio et al., Office Action dated Mar. 31, 2021, directed to U.S. Appl. No. 16/181,076; 10 pages.

Seggio et al., U.S. Office Action dated Apr. 23, 2020, directed to U.S. Appl. No. 16/181,076; 9 pages.

Seggio et al., U.S. Office Action dated Feb. 7, 2020, directed to U.S. Appl. No. 16/181,076; 9 pages.

Seggio et al., U.S. Office Action dated Jul. 22, 2019, directed to U.S. Appl. No. 16/181,076; 9 pages.

Seggio et al., U.S. Office Action dated Nov. 10, 2020, directed to U.S. Appl. No. 16/181,076; 9 pages.

Seggion et al., U.S. Office Action dated Feb. 12, 2018, directed to U.S. Appl. No. 15/153,818; 10 pages.

\* cited by examiner

FAUCET ASSEMBLY WITH INTEGRATED ANTI-SCALD DEVICE

CROSS-REFERENCE TO RELATED APPLICATIONS

This application is a continuation of U.S. patent application Ser. No. 16/181,076, filed Nov. 5, 2018, which is a continuation of U.S. patent application Ser. No. 15/153,818, filed May 13, 2016, now U.S. Pat. No. 10,119,253, the entire contents of each of which is incorporated herein by reference.

FIELD OF THE INVENTION

The present disclosure generally relates to fluid supply assemblies, and more particularly, to faucet assemblies (e.g., electrically or mechanically actuated faucet assemblies) having an integrated anti-scald device and having an integrated temperature mixing valve.

BACKGROUND OF THE INVENTION

In general, fluid supply assemblies for use in fluid systems are known. Some fluid supply assemblies include separate components that utilize various installation spaces and can provide for inefficient and costly installations. As such, some fluid supply assemblies are associated with high material and installation costs, and can provide for complex and/or inefficient installations. Moreover, certain fluid supply assemblies can inefficiently utilize flow control valves to adjust outlet fluid flow from the assemblies.

An interest exists for improved fluid supply assemblies and related methods of use. These and other inefficiencies and opportunities for improvement are addressed and/or overcome by the assemblies, systems and methods of the present disclosure.

SUMMARY OF THE INVENTION

The present disclosure provides for improved fluid supply assemblies and related features, systems and methods of use. More particularly, the present disclosure provides for advantageous faucet assemblies having an integrated anti-scald device and/or having an integrated temperature mixing valve.

In exemplary embodiments, the present disclosure provides for a faucet assembly (e.g., electrically or mechanically actuated faucet assembly) having an integrated temperature mixing valve and/or having an integrated anti-scald device configured to reduce or stop the inlet flow of hot water in the event the mixed outlet water temperature reaches or exceeds a user-adjustable set point (e.g., from about 110° F. to about 120° F.). When implemented, the exemplary faucet assembly can prevent scalding as defined by American Society of Sanitary Engineering ("ASSE") 1070.

In certain embodiments, the integrated faucet assemblies of the present disclosure can eliminate the need for a separate anti-scald device. Additionally, an exemplary integrated faucet assembly can advantageously reduce (i) the number of components required, (ii) the installation space required, and/or (iii) the additional associated installation costs of adding a separate anti-scald device for a faucet.

The configuration and design of an exemplary integrated mixing valve can provide that the hot water flow path may not be open without a cold water flow path also being open, which can thereby limit the maximum temperature of the mixed outlet water flow. The cold water path can also serve as a reset of the integrated anti-scald device used to stop the flow of hot water in the event the outlet water temperature exceeds a setpoint.

The faucet assemblies of the present disclosure (e.g., with the integrated mixing valve and the integrated anti-scald device positioned within the faucet assembly) can be utilized for a variety of uses (e.g., lavatory faucet assembly, kitchen faucet assembly, sink faucet assembly, etc.). For example, an exemplary faucet assembly can take the form of a hands-free electronic sensor actuated faucet assembly (e.g., for use as a lavatory, kitchen or sink faucet assembly, etc.).

The present disclosure provides for a fluid supply assembly including a manifold housing having a hot fluid inlet, a cold fluid inlet, a mixing cavity, a mixed fluid outlet, an anti-scald cavity, and an actuator cavity housing an actuating member; an anti-scald device housed in the anti-scald cavity, the anti-scald device including a thermal actuator and a plunger member; wherein when the actuating member is actuated, hot fluid is configured to travel from the hot fluid inlet to the mixing cavity and cold fluid is configured to travel from the cold fluid inlet to the mixing cavity to mix with the hot fluid to form a mixed fluid flow, the mixed fluid flow configured to travel through a sensing region of the anti-scald cavity and then out the mixed fluid outlet; wherein when the temperature of the mixed fluid flow reaches a set-point temperature in the sensing region, the thermal actuator expands and moves the plunger member to close the hot fluid inlet; and wherein after the hot fluid inlet is closed by the plunger member, cold fluid continues to flow to the sensing region.

The present disclosure also provides for a fluid supply assembly wherein the set-point temperature is user adjustable, such as, for example, to a value that is somewhere in the range from about 110° F. to about 120° F. The present disclosure also provides for a fluid supply assembly further including a mixing valve housed in the mixing cavity, the mixing valve including a hot fluid cam portion and a cold fluid cam portion, the hot fluid cam portion elevating from a recessed end to an elevated end and the cold fluid cam portion elevating from a recessed end to an elevated end. The present disclosure also provides for a fluid supply assembly wherein when the actuating member is actuated, hot fluid is configured to travel from the hot fluid inlet to the hot fluid cam portion and to the mixing cavity, and cold fluid is configured to travel from the cold fluid inlet to the cold fluid cam portion and to the mixing cavity to form the mixed fluid flow.

The present disclosure also provides for a fluid supply assembly wherein the plunger member fluidically separates the sensing region from a plunger region of the anti-scald cavity. The present disclosure also provides for a fluid supply assembly wherein the hot fluid is configured to travel from the hot fluid inlet and to the plunger region of the anti-scald cavity, and then to the mixing cavity to form the mixed fluid flow.

The present disclosure also provides for a fluid supply assembly further including a spout housing having a spout opening, the spout housing configured to house the manifold housing, and the mixed fluid flow is configured to travel from the mixed fluid outlet to the spout opening. The present disclosure also provides for a fluid supply assembly wherein the actuating member is an electrically actuated valve member. The present disclosure also provides for a fluid supply assembly wherein the actuating member is a mechanically actuated valve member.

The present disclosure also provides for a fluid supply assembly wherein the thermal actuator includes a wax member. The present disclosure also provides for a fluid supply assembly wherein the mixing valve is substantially cylindrical and includes a mixing portion positioned between the hot fluid cam portion and the cold fluid cam portion.

The present disclosure also provides for a fluid supply assembly wherein the mixing valve includes a shaft portion configured to mount to a handle member. The present disclosure also provides for a fluid supply assembly further including a limiting member positioned on the shaft portion and housed in the handle member, the limiting member configured to restrict movement of the mixing valve to a hot fluid position thereby reducing the hot fluid flow from the hot fluid inlet when the mixing valve is positioned in the hot fluid position.

The present disclosure also provides for a fluid supply assembly including a manifold housing having a hot fluid inlet, a cold fluid inlet, a mixing cavity, a mixed fluid outlet, and an actuator cavity housing an actuating member; a mixing valve housed in the mixing cavity, the mixing valve including a hot fluid cam portion and a cold fluid cam portion, the hot fluid cam portion elevating from a recessed end to an elevated end and the cold fluid cam portion elevating from a recessed end to an elevated end; wherein when the actuating member is actuated, hot fluid is configured to travel from the hot fluid inlet to the hot fluid cam portion and to the mixing cavity, and cold fluid is configured to travel from the cold fluid inlet to the cold fluid cam portion and to the mixing cavity to form the mixed fluid flow; and wherein the hot fluid cam portion and the cold fluid cam portion are configured to allow a user to move the mixing valve to multiple different positions for simultaneous adjustment of flows of both the hot fluid and cold fluid to the mixing cavity and then to the mixed fluid outlet.

The present disclosure also provides for a fluid supply assembly wherein when the mixing valve is moved to a full hot position, cold fluid continues to flow to the mixing cavity; and wherein when hot fluid flows through the mixing valve to the mixing cavity, cold fluid also flows through the mixing valve and to the mixing cavity.

The present disclosure also provides for a fluid supply assembly wherein when the mixing valve is moved to a neutral position, the elevated end of the cold fluid cam portion is positioned proximal to a lower end of the cold fluid inlet. The present disclosure also provides for a fluid supply assembly wherein when the mixing valve is moved to a full cold position, the recessed end of the cold fluid cam portion is positioned proximal to an upper end of the cold fluid inlet and the elevated end of the cold fluid cam portion is positioned a distance away from a lower end of the cold fluid inlet. The present disclosure also provides for a fluid supply assembly wherein when the mixing valve is moved to a full cold position, the elevated end of the hot fluid cam portion prevents hot fluid from entering the mixing cavity.

The present disclosure also provides for a fluid supply assembly wherein when the mixing valve is moved to a full hot position: (i) the elevated end of the cold fluid cam portion is positioned proximal to an upper end of the cold fluid inlet thereby allowing a low flow of cold fluid to enter the mixing chamber, and (ii) the recessed end of the hot fluid cam portion is positioned below a lower end of an internal hot fluid line thereby allowing a substantially full flow of hot fluid to enter the hot fluid cam portion and travel to the mixing chamber.

The present disclosure also provides for a fluid supply assembly including a manifold housing having a hot fluid inlet, a cold fluid inlet, a mixing cavity, a mixed fluid outlet, an anti-scald cavity, and an actuator cavity housing an actuating member; an anti-scald device housed in the anti-scald cavity, the anti-scald device including a thermal actuator, a plunger member, a biasing member, and an adjustable cap member, the cap member adjustably engaged at a first end of the anti-scald cavity and the biasing member positioned against a second end of the anti-scald cavity, with the biasing member providing a biasing force to the thermal actuator and the plunger member against the cap member; a stop member mounted to the first end of the anti-scald cavity, the cap member adjustable by a user to move from the stop member toward the second end of the anti-scald cavity; wherein when the actuating member is actuated, hot fluid is configured to travel from the hot fluid inlet to the mixing cavity and cold fluid is configured to travel from the cold fluid inlet to the mixing cavity to mix with the hot fluid to form a mixed fluid flow, the mixed fluid flow configured to travel through a sensing region of the anti-scald cavity and then out the mixed fluid outlet; wherein when the temperature of the mixed fluid flow reaches a set-point temperature in the sensing region, the thermal actuator expands and moves the plunger member to close the hot fluid inlet; and wherein after the cap member is moved toward the second end of the anti-scald cavity, the set-point temperature of the sensing region decreases.

Additional advantageous features, functions and applications of the disclosed assemblies, systems and methods of the present disclosure will be apparent from the description which follows, particularly when read in conjunction with the appended figures. The references listed in this disclosure are hereby incorporated by reference in their entireties.

BRIEF DESCRIPTION OF THE DRAWINGS

Features and aspects of embodiments are described below with reference to the accompanying drawings, in which elements are not necessarily depicted to scale.

Exemplary embodiments of the present disclosure are further described with reference to the appended figures. It is to be noted that the various features, steps and combinations of features/steps described below and illustrated in the figures can be arranged and organized differently to result in embodiments which are still within the scope of the present disclosure. To assist those of ordinary skill in the art in making and using the disclosed assemblies, systems and methods, reference is made to the appended figures, wherein.

DETAILED DESCRIPTION OF INVENTION

Figure 1:
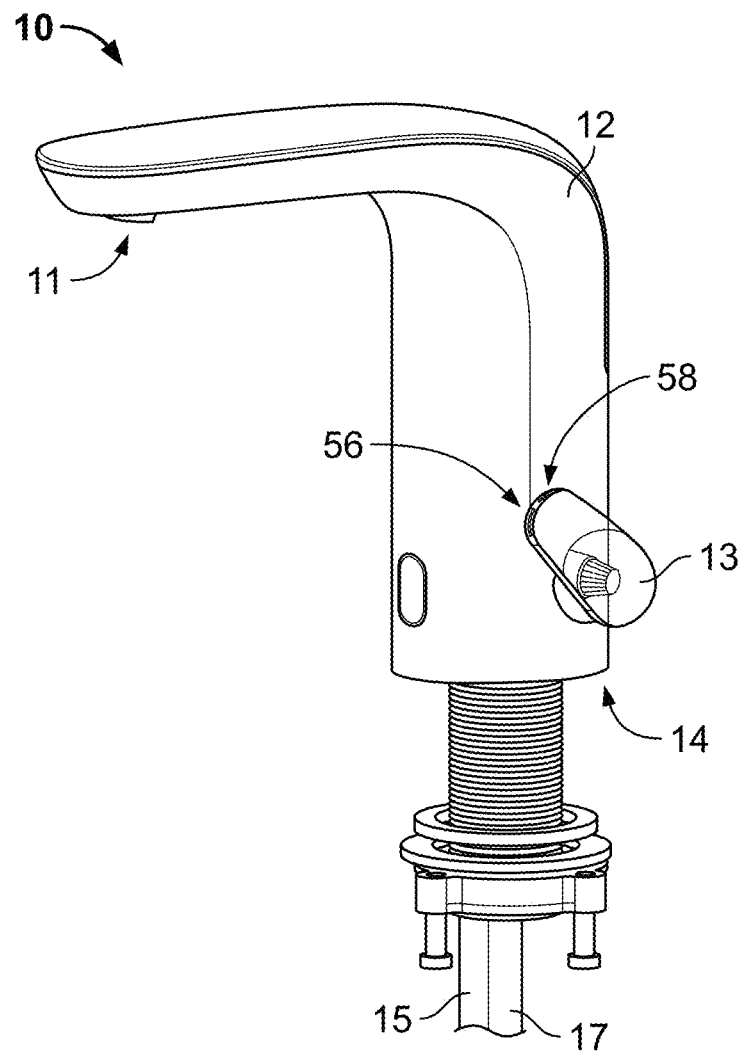
FIG. 1 is a side perspective view of an exemplary fluid supply assembly according to the present disclosure.

The exemplary embodiments disclosed herein are illustrative of advantageous fluid supply assemblies (e.g., faucet assemblies), and systems of the present disclosure and methods/techniques thereof. It should be understood, however, that the disclosed embodiments are merely exemplary of the present disclosure, which may be embodied in various forms. Therefore, details disclosed herein with reference to exemplary fluid supply assemblies/fabrication methods and associated processes/techniques of assembly and use are not to be interpreted as limiting, but merely as the basis for teaching one skilled in the art how to make and use the advantageous fluid supply assemblies/systems of the present disclosure.

The present disclosure provides for improved fluid supply assemblies for fluid systems. More particularly, the present disclosure provides for advantageous faucet assemblies (e.g., electrically or mechanically actuated faucet assemblies) having an integrated anti-scald device and having an integrated temperature mixing valve.

In general, the present disclosure provides for a faucet assembly having an integrated temperature mixing valve, and having an integrated anti-scald device configured to reduce or stop the inlet flow of hot water in the event the mixed outlet water temperature reaches or exceeds a user-selected set point. Exemplary faucet assemblies of the present disclosure can prevent scalding as defined by ASSE 1070.

The faucet assemblies of the present disclosure can eliminate the need for a separate anti-scald device, thereby advantageously reducing the number of components required and/or reducing the installation costs/space required.

An exemplary mixing valve can provide that the hot water flow path may not be open without a cold water flow path also being open, thereby limiting the maximum temperature of the mixed outlet water flow. As discussed further below, the cold water path can also serve as a reset of the integrated anti-scald device.

Exemplary faucet assemblies having the integrated mixing valve and having the integrated anti-scald device positioned within the faucet assembly (e.g., mixing valve and anti-scald device positioned within the manifold housing or body of the faucet assembly) can be utilized for a variety of uses (e.g., lavatory faucet assembly, kitchen faucet assembly, sink faucet assembly, etc.).

The incorporation of an integrated mechanical mixing valve and an integrated anti-scald device positioned within the faucet assembly (e.g., within manifold housing) can advantageously reduce the material cost, installation complexity, the associated installation costs, and/or space requirements compared to some conventional assemblies having separate mixing valves connecting to faucet bodies.

Additionally, with such integrated configurations/designs of the present disclosure, proportional inlets are not required to limit the maximum water temperature mix. The hot water flow can be stopped quickly and completely (not just reduced substantially) if the mixed water temperature exceeds a maximum preset temperature (e.g., complying with ASSE 1070), while still allowing cold water, if available, to flow. This cold water flow can also provide cooling to the anti-scald device (e.g., thermal responsive valve), thereby functioning as a "reset" feature which allows the hot water to quickly again begin flowing and mixing with the cold water flow.

An exemplary mixing valve (e.g., in the form of a coupled dual cam mixing valve control shaft) can permit constant simultaneous adjustment of both the hot and cold water to mix to the desired outlet temperature. Using this assembly, the flow rate of mixed water can stay more constant (e.g., as the cold flow is increased, the hot flow is decreased; as the hot flow is increased, the cold flow is decreased). This is an improvement over conventional systems/methods of simply adjusting the cold water flow to control the outlet temperature. It is also an improvement over using and having to adjust two individual flow control valves (e.g., an individual hot valve and an individual cold valve), as exemplary assemblies of the present disclosure may advantageously use the one mixing valve to control the flow of both hot and cold water flows.

Additionally, a mechanical limiting device can be incorporated to restrict the movement of the mixing valve (e.g., mixing valve control shaft), thereby reducing the hot water flow path and related hot water flow. This can reduce the maximum outlet water temperature.

As discussed further below, other embodiments can include pressure compensating flow regulators in each of the hot and cold water supply lines. These regulators/devices can maintain a constant flow of each inlet fluid by adjusting the fluid path orifice size based on the related water pressure (e.g., as pressure increases, the orifice opening decreases, maintaining a more constant flow). This can minimize the outlet mixed water temperature variations.

Referring now to the drawings, like parts are marked throughout the specification and drawings with the same reference numerals, respectively. Drawing figures are not necessarily to scale and in certain views, parts may have been exaggerated for purposes of clarity.

Figure 2:
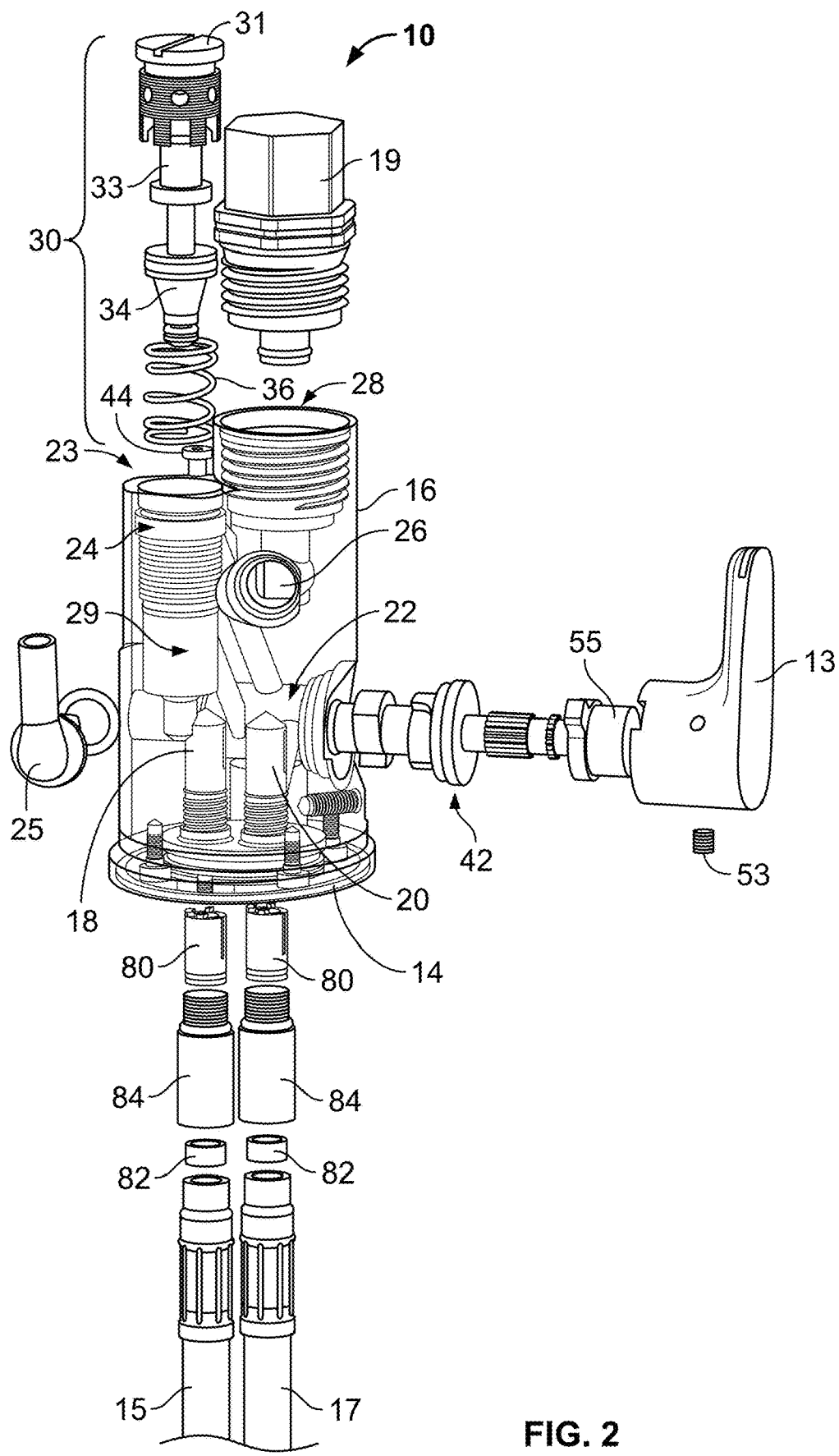
FIG. 2 is an exploded partial side perspective view of the fluid supply assembly of FIG. 1, prior to assembly and showing internal features of the manifold housing.
Figure 4:
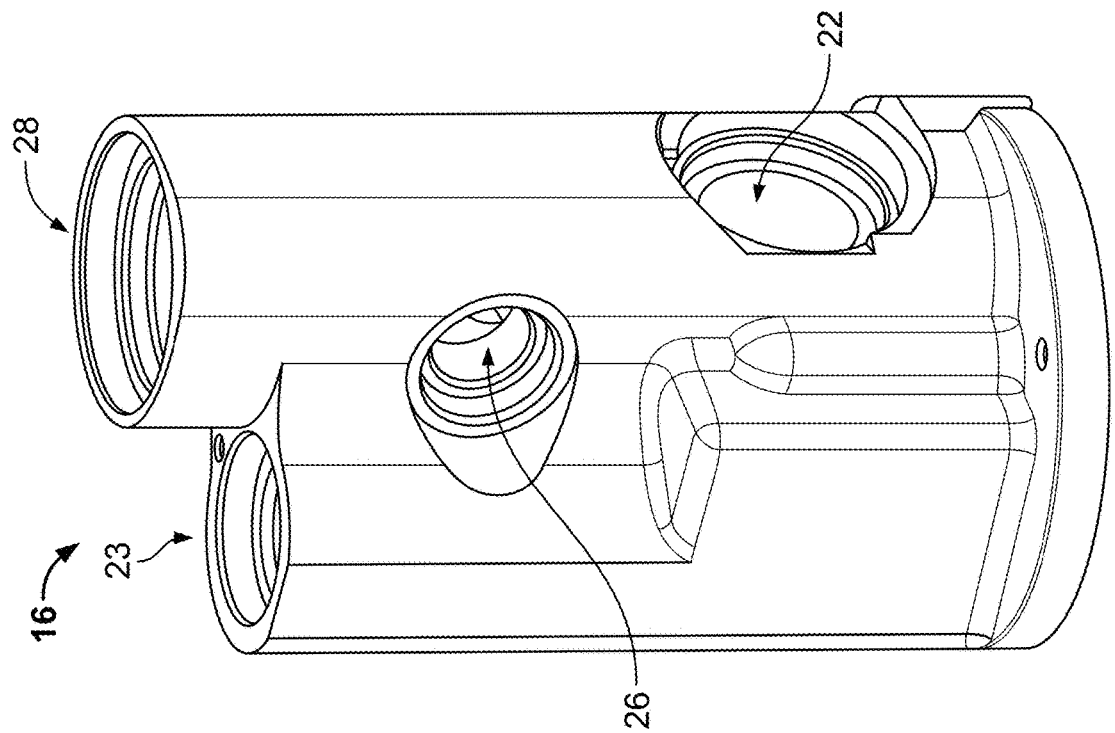
FIG. 4 is a side perspective view of the manifold housing of the assembly of FIG. 2, and showing external features of the manifold housing.
Figure 3:
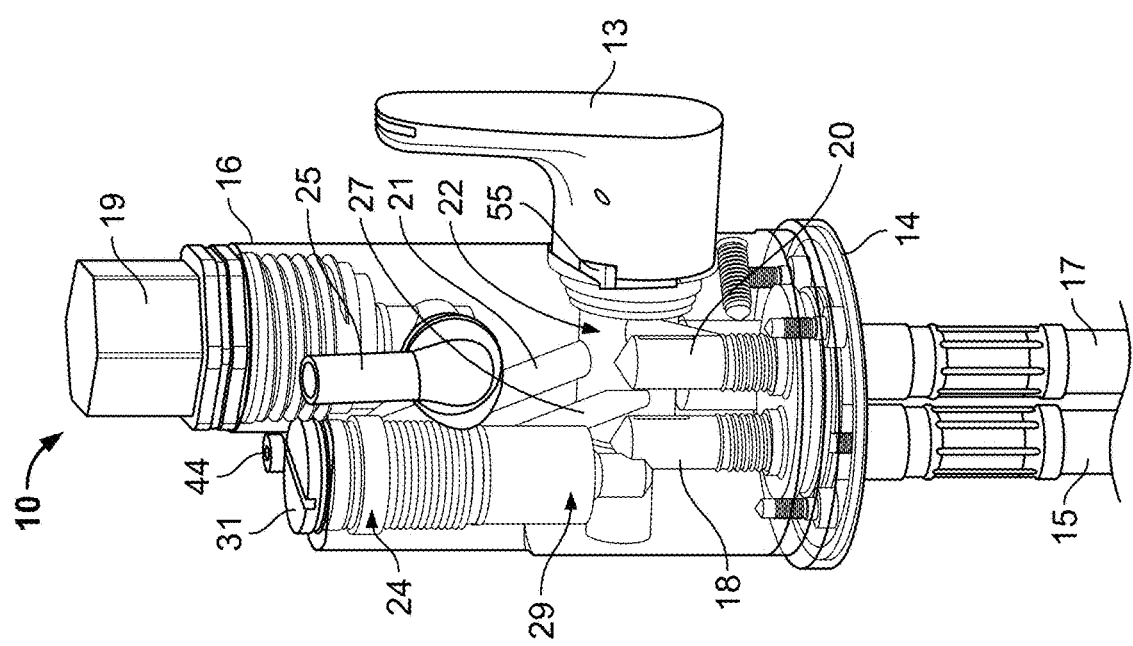
FIG. 3 is a side perspective view of the assembly of FIG. 2, after assembly.
Figure 5:
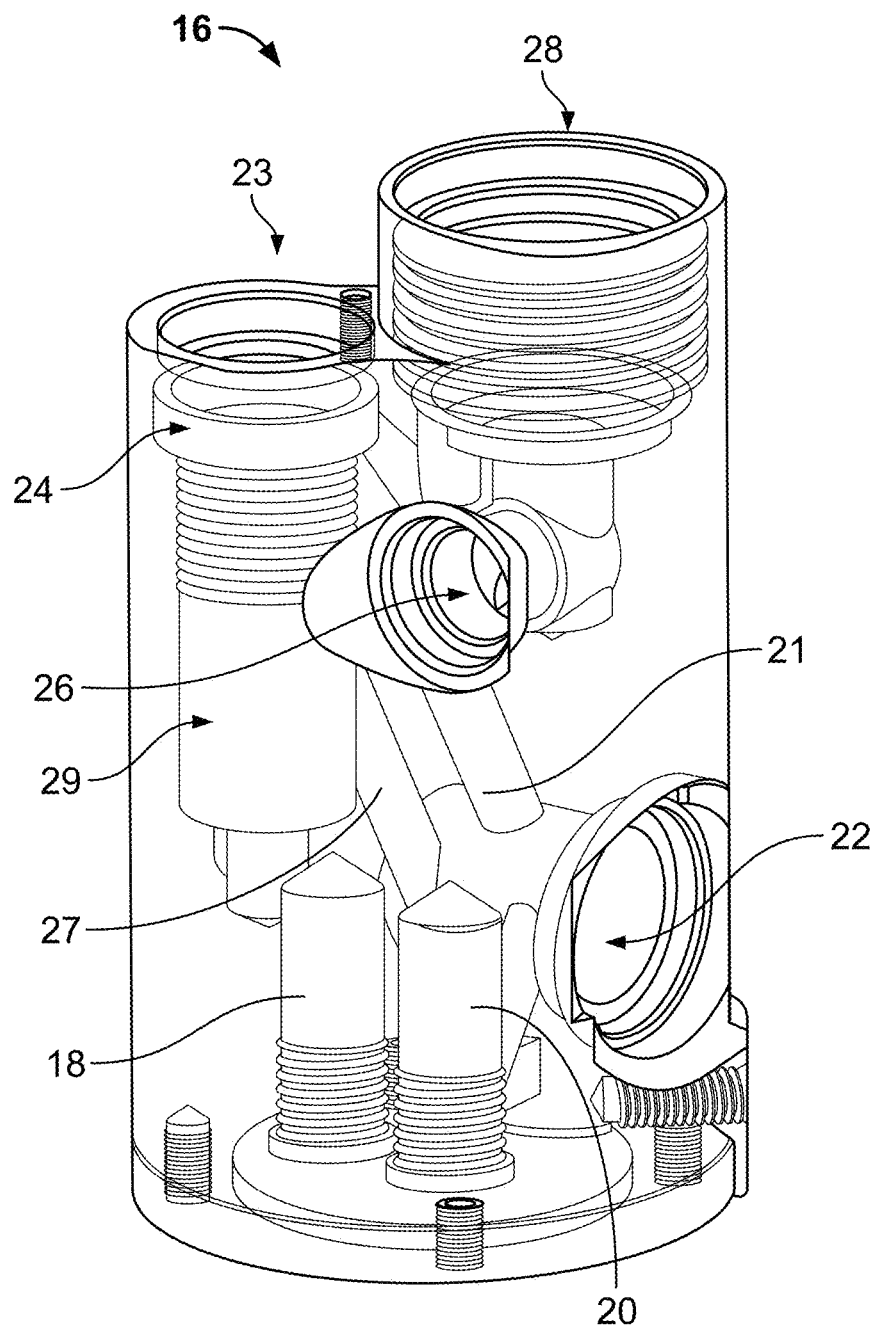
FIGS. 5-6 are side perspective views of the manifold housing of FIG. 2.

Referring now to FIGS. 1-3, there is illustrated a fluid supply assembly 10 (e.g., faucet assembly 10) according to exemplary embodiments of the present disclosure.

As shown in FIGS. 1-3, exemplary faucet assembly 10 includes a spout housing 12, a spout opening 11, a handle member 13, and a base adapter 14 mounted to and/or within spout housing 12. Faucet assembly 10 also includes a hot fluid (e.g., water) supply line/hose 15 and a cold fluid (e.g., water) supply line/hose 17.

As shown in FIGS. 2-3, a manifold housing 16 is configured to be mounted to base adapter 14, and is configured to be mounted and/or positioned within spout housing 12. Manifold housing 16 includes a hot fluid (e.g., water) inlet 18 in fluid communication with hot fluid supply line 15, and includes a cold fluid (e.g., water) inlet 20 in fluid communication with cold fluid supply line 17.

In exemplary embodiments, hot water travels from supply line 15 to hot water inlet 18, through plunger region 29 of anti-scald cavity 23, and then travels via internal line 27 to mixing cavity 22 of manifold housing 16.

Cold water travels from supply line 17 to cold water inlet 20, and then travels to mixing cavity 22, where the hot and cold water mixes together to form a mixed water flow. As discussed further below and during operation of faucet assembly 10 via actuation of actuating member 19 (e.g., electrically or mechanically actuated on/off valve member 19), mixed water is configured to travel from the mixing cavity 22 to sensing region 24 of anti-scald cavity 23 via mixed fluid/water line 21, and then out of manifold housing 16 via mixed fluid/water outlet 26 of manifold housing 16 (e.g., via actuated valve member 19). In certain embodiments, actuating member 19 is mounted to manifold housing via actuator cavity 28 (e.g., via threads of member 19 and cavity 28).

In certain embodiments, an adapter member 25 is mounted to mixed water outlet 26, and the adapter member 25 communicates the mixed water to the spout opening 11 (e.g., via an outlet line/hose) and to a user (FIGS. 1 and 3).

Figure 11:
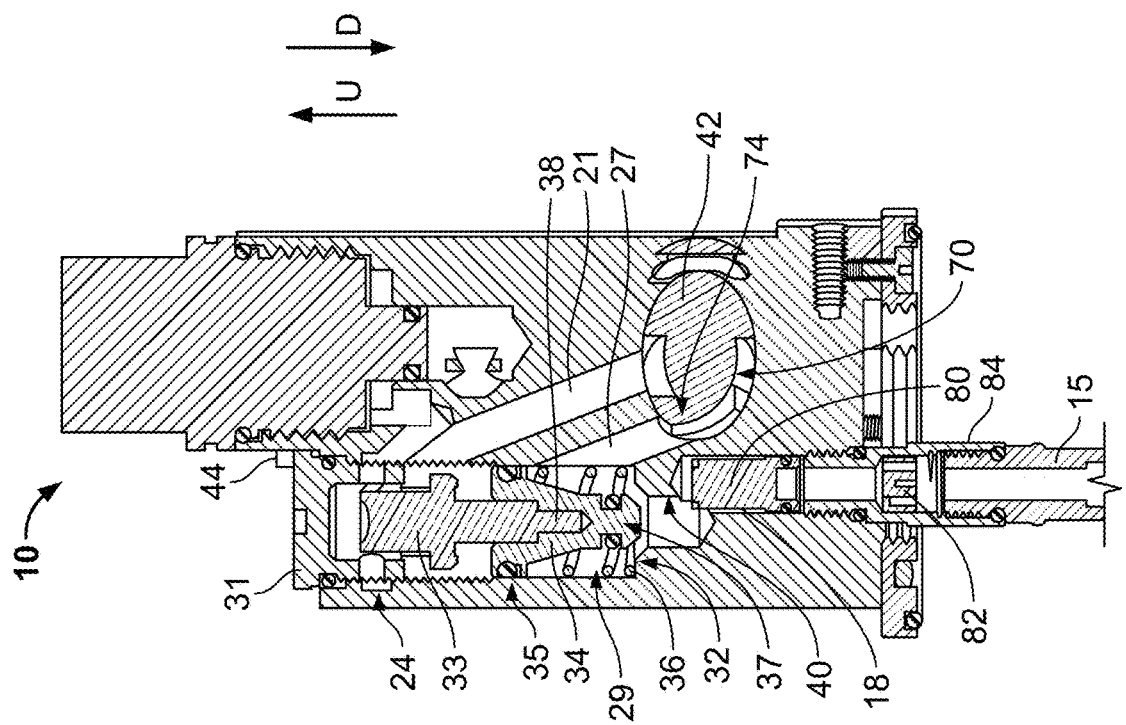
FIGS. 10-16 are cross-sectional side views of the assembly of FIG. 3.
Figure 10:
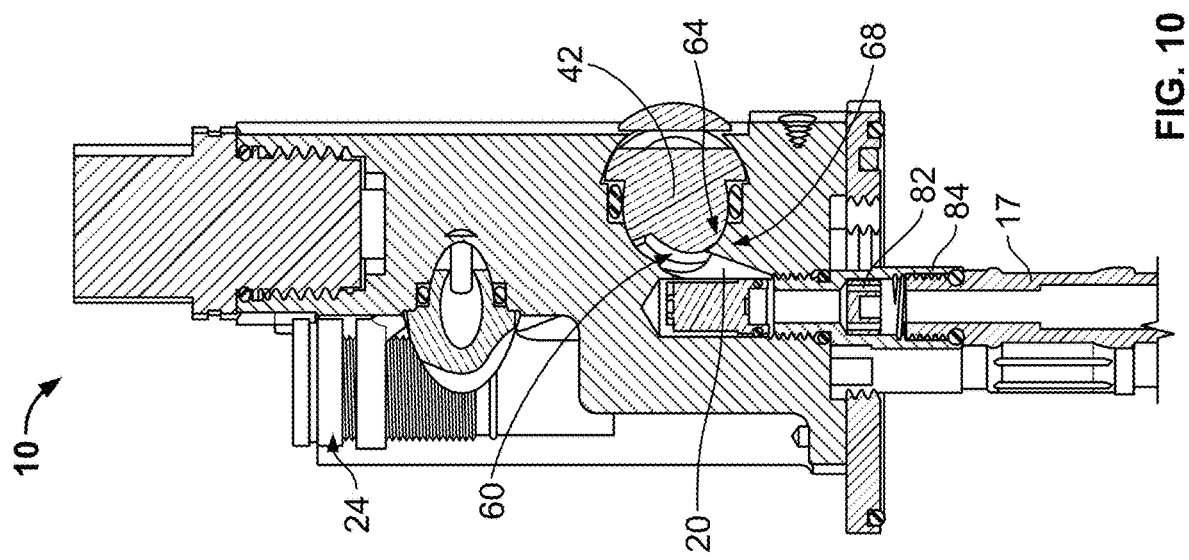

In certain embodiments and as shown in FIGS. 2, 10 and 11, faucet assembly 10 can include check valves 80, pressure compensating flow regulators 82, and housings 84 for the pressure compensating flow regulators 82. For example and as depicted in FIGS. 2, 10 and 11, the inlets 18, 20 can include a check valve 80 mounted therein to prevent backflow.

In some embodiments, pressure compensating flow regulators 82 within housings 84 are provided in each of the hot and cold water supply lines 15, 17.

For example as shown in FIGS. 2, 10 and 11, housings 84 can be mounted to lines 15, 17, and a pressure compensating flow regulator 82 can be mounted/positioned within each housing 84. Exemplary pressure compensating flow regulators 82 are configured to maintain a constant flow of each inlet 18, 20 fluid from supply lines 15, 17 by adjusting the fluid path orifice size based on the related fluid/water pressure (e.g., as pressure increases, the orifice opening decreases, maintaining a more constant flow).

Figure 18:
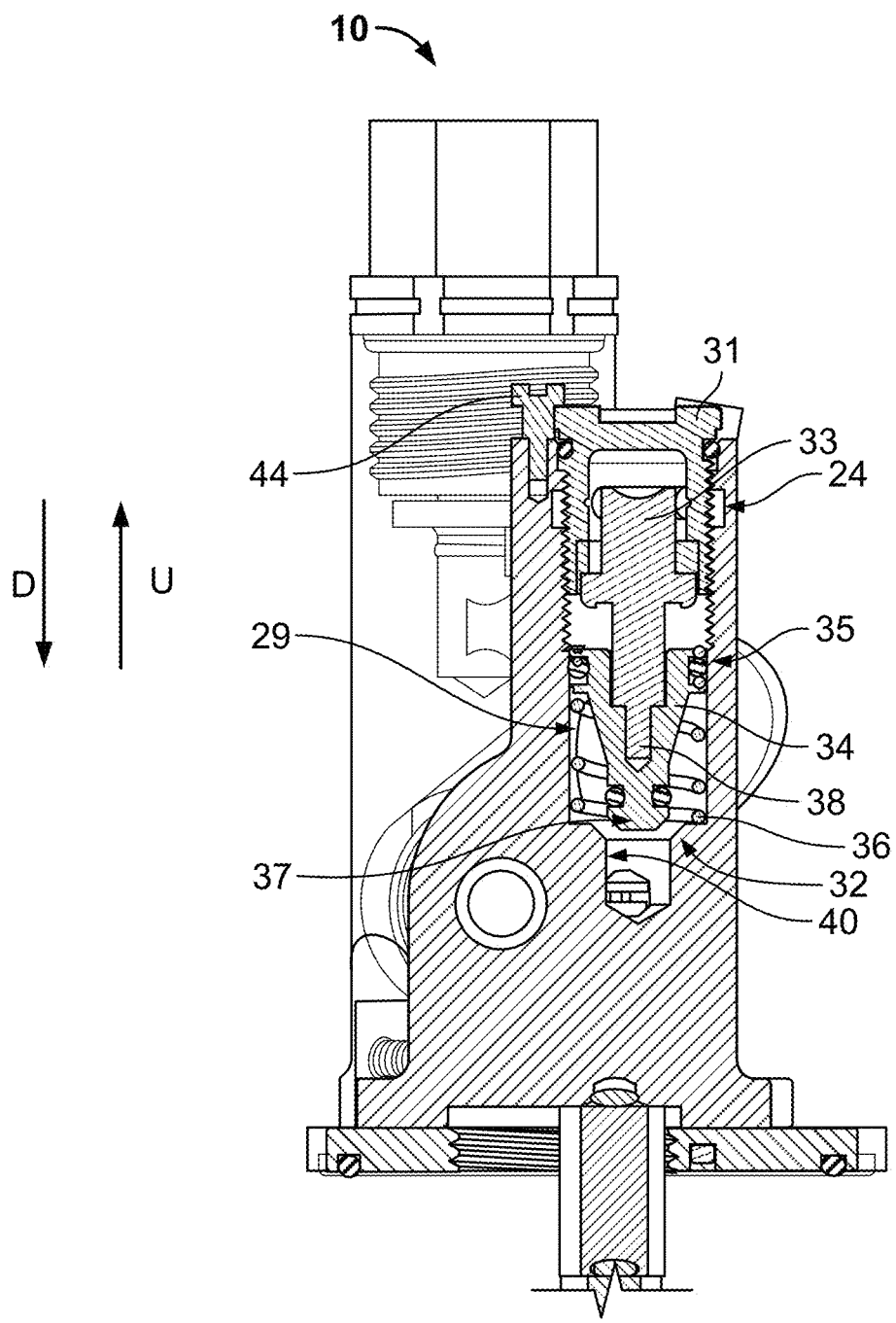
FIG. 18 is a cross-sectional side view of the assembly of FIG. 3.

Exemplary manifold housing 16 also includes anti-scald cavity 23. As shown in FIGS. 2, 11 and 18, anti-scald cavity 23 is configured and dimensioned to mount with and/or house anti-scald device/assembly 30. As depicted in FIGS. 2, 11 and 18, anti-scald device/assembly 30 includes adjustable cap member 31, thermal actuator 33 (e.g., wax element 33), plunger member 34, and bias spring 36.

As shown in FIGS. 11 and 18, assembled and mounted anti-scald device 30 within cavity 23 separates cavity 23 into a sensing region 24 and a movable plunger region 29. For example, the proximal end of plunger member 34 can include gasketing material (e.g., one or more O-rings) that fluidically separates sensing region 24 from movable plunger region 29. As depicted in FIGS. 11 and 18, movable plunger region 29 can be in fluid communication with hot water inlet 18, and can be in fluid communication with internal line 27.

Still referring to FIGS. 11 and 18, bias spring 36 is positioned against an abutment surface 32 of plunger region 29, and provides a biasing force in the direction of Arrow U against thermal actuator 33 and plunger member 34, and against stop member 44.

As noted and during operation of faucet assembly 10, mixed water is configured to travel from the mixing cavity 22 to sensing region 24 of anti-scald cavity 23 via mixed fluid/water line 21. The distal end 38 of the thermal actuator 33 (e.g., wax element 33) is configured to expand along its central longitudinal axis as the temperature of the mixed water in the sensing region 24 increases.

At a user-selected temperature set point of the mixed water in the sensing region 24 (e.g., from about 110° F. to about 120° F.), the expansion of the thermal actuator 33 overcomes the bias force of spring 36, and the expansion of the distal end 38 of the actuator 33 forces the plunger member 34 in the direction of Arrow D until the distal end 37 of the plunger member 34 contacts the cylindrical seating surface 40 of plunger region 29, thereby preventing hot water from moving from the hot water inlet 18 into the plunger region 29, and thus thereby preventing hot water from moving from the inlet 18 to the internal line 27 that feeds mixing cavity 22. The user-selected temperature set point can be adjusted via mechanical means to arrive at a desired set point (e.g., 110° F., 111.7° F., 112.3° F., 115° F., 116° F., 118.4° F., 118.9° F., or 120° F.).

As such, integrated anti-scald device/assembly 30 within manifold housing 16 is configured to reduce or stop the inlet 18 flow of hot water in the event the mixed outlet water temperature reaches or exceeds a user-selected set point. When implemented, the exemplary anti-scald device/assembly 30 of faucet assembly 10 can prevent scalding as defined by ASSE 1070.

By way of example and when the user-selected set point of the mixed water that contacts the thermal actuator 33 is set to about 117° F. to about 120° F., when the mixed water reaches around 112° F. in the sensing region 24, the distal end 38 of thermal actuator 33 extends around 2.25 mm in the direction of arrow D and starts to shut off the hot water fluid path through region 29. As the mixed water temperature increases in sensing region 24, the distal end 38 of thermal actuator 33 extends further in the direction of arrow D, until the temperature reaches about 117° F. At this temperature the distal end 38 of thermal actuator 33 will be substantially fully extended in the direction of arrow D (around 5 mm), thereby stopping the hot water flow to mixing cavity 22 as discussed above.

Moreover and as discussed further below in connection with the operation of advantageous mixing valve 42, when the mixing valve 42 is positioned in the full hot water position there is also a cold water path open to the thermal actuator 33 (e.g., via line 21 from mixing cavity 22 and from inlet 20). As such, in the event that the hot temperature limit is reached and the hot water is stopped by the anti-scald device/assembly 30 as discussed above, the cold water will continue to flow to the thermal actuator 33 and cool and contract the thermal actuator 33 and allow it to reset (e.g., move the plunger to the open position shown in FIGS. 11 and 18). Without such cold water flow to the thermal actuator 33, the thermal actuator 33 would, in a slower fashion, depend on the conductive cooling of its surroundings (e.g., the cooling of the metals and water surrounding it) before the thermal actuator 33 could begin to operate again. And, even then and without such cold water flow to the actuator 33, the hot water immediately available to the thermal actuator 33 after such slower conductive cooling reset can, in a quicker fashion, cause the thermal actuator 33 to stop hot water flow again.

Figure 17A:
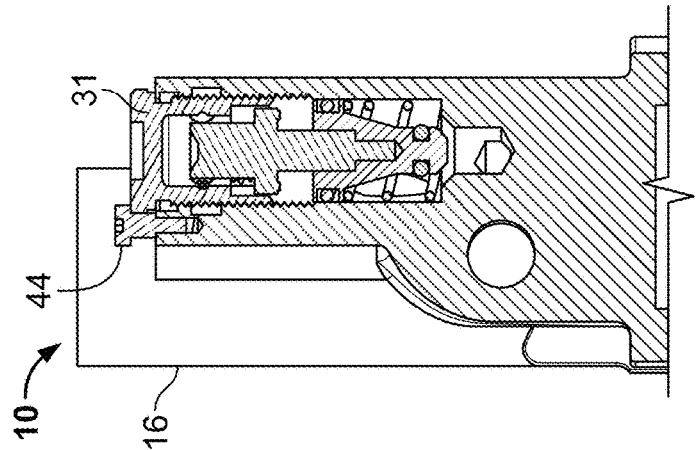
FIG. 17A is a partial cross-sectional side view of the assembly of FIG. 3.
Figure 17B:
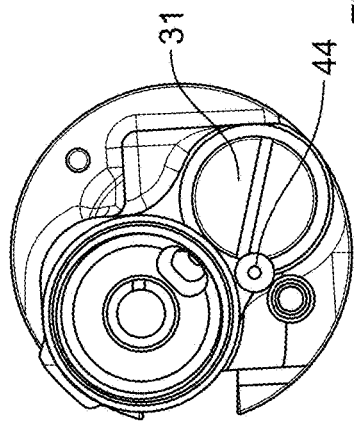
FIG. 17B is a partial top view of the assembly of FIG. 17A.

In exemplary embodiments and referring again to FIGS. 2, 3 and 18 (and also to FIGS. 17A and 17B), anti-scald device/assembly 30 also includes the stop member 44, which is configured to mount to manifold housing 16. The position of the user-adjustable cap member 31 results in the position of the thermal actuator 33, and exemplary stop member 44 takes the form of a shoulder bolt for stopping the upward (direction U) motion of the adjustable cap member 31.

For example, a user can select and re-select the maximum fail-safe set-point temperature of the mixed water that contacts the thermal actuator 33 (e.g., from 120° F. to 105° F.) by rotating/screwing the cap member 31 (e.g., within a 360° range of cap member 31) in the direction of arrow D (FIG. 18), thereby moving the cap member 31, thermal actuator 33 and plunger member 34 in the direction of arrow D, and thus thereby reducing the user-selected maximum fail-safe set-point temperature of the thermal actuator 33 (e.g., from 120° F. as shown in FIG. 18, to 110° F. after the cap member 31 is moved in the direction of arrow D). After the cap member 31 has been moved in the direction of arrow D, a user could then adjust cap member 31 in the direction of arrow U to return the assembly 30 to a user-selected 120° F. set-point temperature as depicted in FIG. 18 and/or to another desired temperature within the bounds of the stop member 44. In this regard, cap member 31 advantageously provides a temperature adjustment screw for user-adjustment of the set-point temperature of the mixed water that contacts the thermal actuator 33 in the sensing region 24.

As noted and with reference to FIGS. 2-7, exemplary manifold housing 16 also includes mixing cavity 22. Exemplary mixing cavity 22 is configured and dimensioned to mount with and/or house and mixing valve 42.

Figure 7:
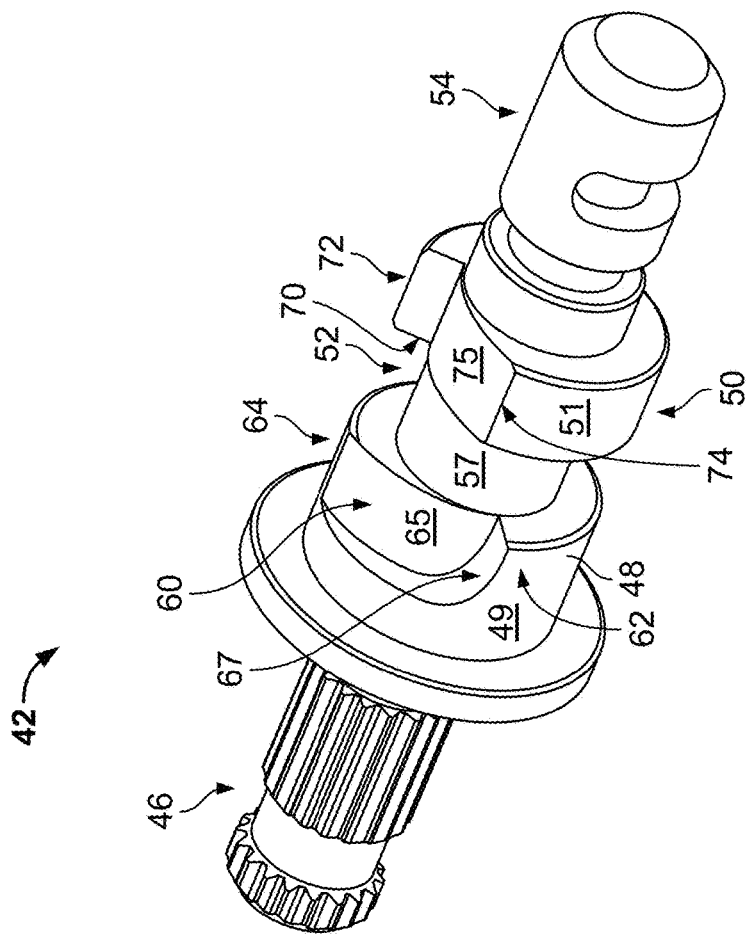
FIG. 7 is a side perspective view of the mixing valve of FIG. 2.
Figure 6:
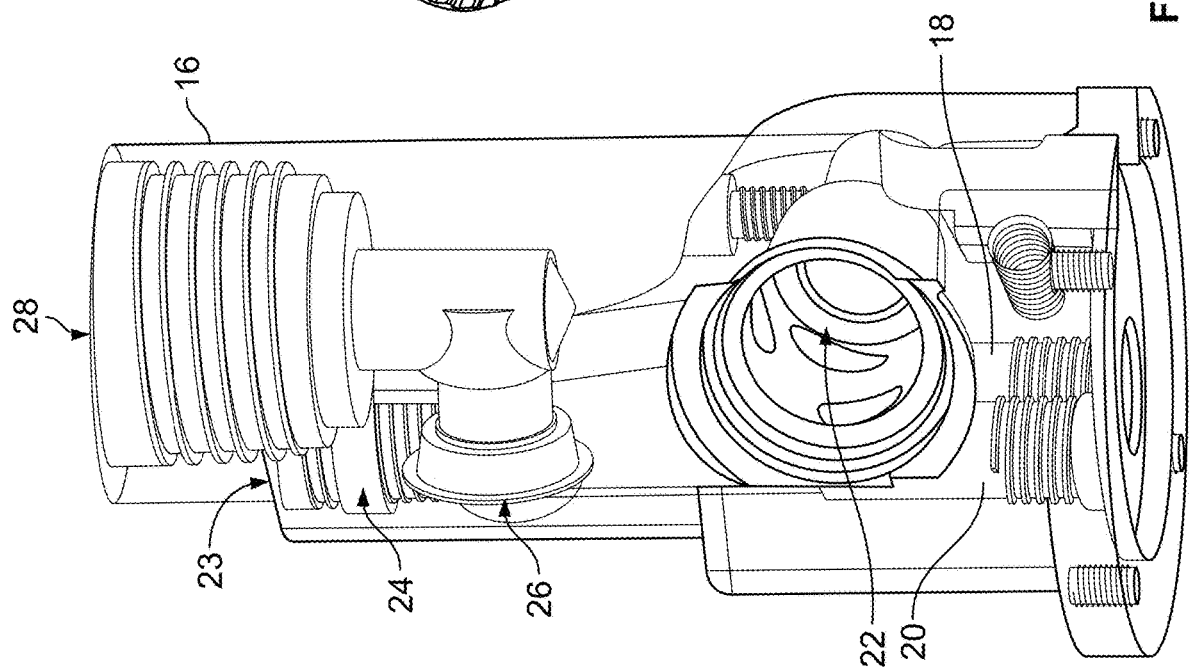

In exemplary embodiments and as shown in FIG. 7, mixing valve 42 takes the form of a coupled dual cam mixing valve control shaft 42. Exemplary mixing valve 42 is substantially cylindrical, and includes a shaft portion 46, a cold water portion 48, a hot water portion 50, and a mixing portion 52 positioned between cold/hot portions 48, 50. Mixing valve 42 also includes extending portion 54 that extends within mixing cavity 22 after assembly.

Shaft portion 46 is configured to mount to handle member 13. For example and as shown in FIG. 2, fastener member 53 can be mounted to handle member 13 and to shaft portion 46 to releasably mount shaft portion 46 to handle member 13.

A mechanical limiting member 55 can be positioned/mounted on shaft portion 46 and housed within handle member 18 (FIGS. 2 and 3). Exemplary mechanical limiting member 55 is configured to restrict the rotation/movement of the mixing valve 42 to a hot water position, thereby reducing the flow through hot water inlet 18 and reducing the related hot water flow within manifold housing 16. This can reduce the maximum outlet water temperature through outlet 26. Exemplary handle member 13 also includes a cold water position indicator 56 and a hot water position indicator 58.

As discussed further below, exemplary mixing valve 42 is configured to permit constant simultaneous adjustment of flows of both the hot and cold water inlets 18, 20 to mix to the desired outlet temperature through outlet 26. As such and using mixing valve 42 of assembly 10, the flow rate of mixed water through outlet 26 can stay more constant (e.g., as the cold flow is increased through inlet 20, the hot flow is decreased through inlet 18; as the hot flow is increased through inlet 18, the cold flow is decreased through inlet 20). This is an improvement over conventional systems/methods of simply adjusting the cold water flow to control the outlet temperature. It is also an improvement over using and having to adjust two individual conventional flow control valves (e.g., an individual hot valve and an individual cold valve), as exemplary assemblies 10 of the present disclosure may advantageously use the one mixing valve 42 to control the flow of both hot and cold water flows through inlets 18, 20.

As shown in FIG. 7, the cold water portion 48 is substantially cylindrical and includes upper surface 49. Recessed within upper surface 49 is a cam portion 60 that includes a lower surface 65 that extends and slopes/elevates from a recessed end 62 to an elevated end 64. As such, the lower surface 65 at the recessed end 62 is positioned farther from the upper surface 49 than the lower surface 65 at the elevated end 64. In exemplary embodiments, the lower surface 65 of elevated end 64 is positioned proximal to upper surface 49. Moreover and discussed further below, exemplary lower surface 65 of recessed end 62 is positioned proximal to lower surface 57 of mixing portion 52. Cold water portion 48 also includes sidewall 67 extending (e.g., transversely) from lower surface 65 to upper surface 49 to define cam portion 60.

Similarly, exemplary hot water portion 50 is substantially cylindrical and includes upper surface 51. Recessed within upper surface 51 is a cam portion 70 that includes a lower surface 75 that extends and slopes/elevates from a recessed end 72 to an elevated end 74. As such, the lower surface 75 at the recessed end 72 is positioned farther from the upper surface 49 than the lower surface 75 at the elevated end 74. In exemplary embodiments, the lower surface 75 of elevated end 74 is positioned proximal to upper surface 49. Moreover, exemplary lower surface 75 of recessed end 72 is positioned proximal to lower surface 57 of mixing portion 52.

In exemplary embodiments, FIGS. 3 and 10-11 depict the positions of the handle member 13 and the mixing valve 42 when the handle member 13 and mixing valve 42 are positioned, moved or rotated in the neutral position.

In such a position and when actuating member 19 has been actuated, cold water from supply line 17 will enter cold water inlet 20. From cold water inlet 20 and as shown in FIG. 10, cold water will enter the cam portion 60 of cold water portion 48 of mixing valve 42, and then travel to mixing portion 52 of mixing valve 42. The cold water can then travel from the mixing portion 52 of mixing valve 42 to mixed water line 21 (FIG. 8), and then on to sensing region 24, and then to outlet 26.

As shown in FIG. 10, when the handle member 13 and mixing valve 42 are positioned in the neutral position, the elevated end 64 of cold water portion 48 of mixing valve 42 is positioned proximal to a lower end 68 of cold water inlet 20, thereby allowing an intermediate flow of cold water to enter cam portion 60 of cold water portion 48 of mixing valve 42 from inlet 20.

As shown in FIG. 11, when the handle member 13 and mixing valve 42 are positioned in the neutral position and when actuating member 19 has been actuated, hot water from supply line 15 will enter hot water inlet 18, travel through plunger region 29, and then travel to internal line 27. From internal line 27 and as shown in FIG. 11, hot water will enter the cam portion 70 of hot water portion 50 of mixing valve 42, and then travel to mixing portion 52 of mixing valve 42. The hot water can then travel from the mixing portion 52 of mixing valve 42 to mixed water line 21 (FIG. 8), and then on to sensing region 24, and then to outlet 26.

As shown in FIG. 11, when the handle member 13 and mixing valve 42 are positioned in the neutral position, the elevated end 74 of hot water portion 50 of mixing valve 42 is positioned substantially in the middle of the inlet of internal line 27, thereby allowing an intermediate flow of hot water to enter cam portion 70 of hot water portion 50 of mixing valve 42 from internal line 27.

Figure 9:
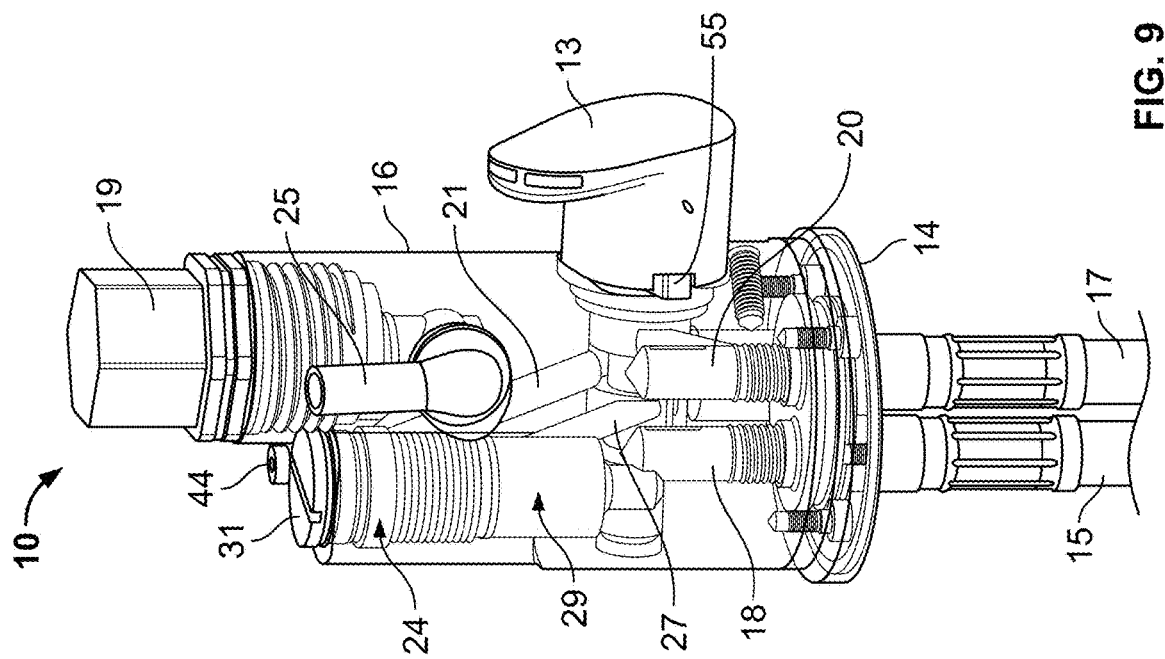
FIGS. 8-9 are side perspective views of the assembly of FIG. 3.
Figure 15:
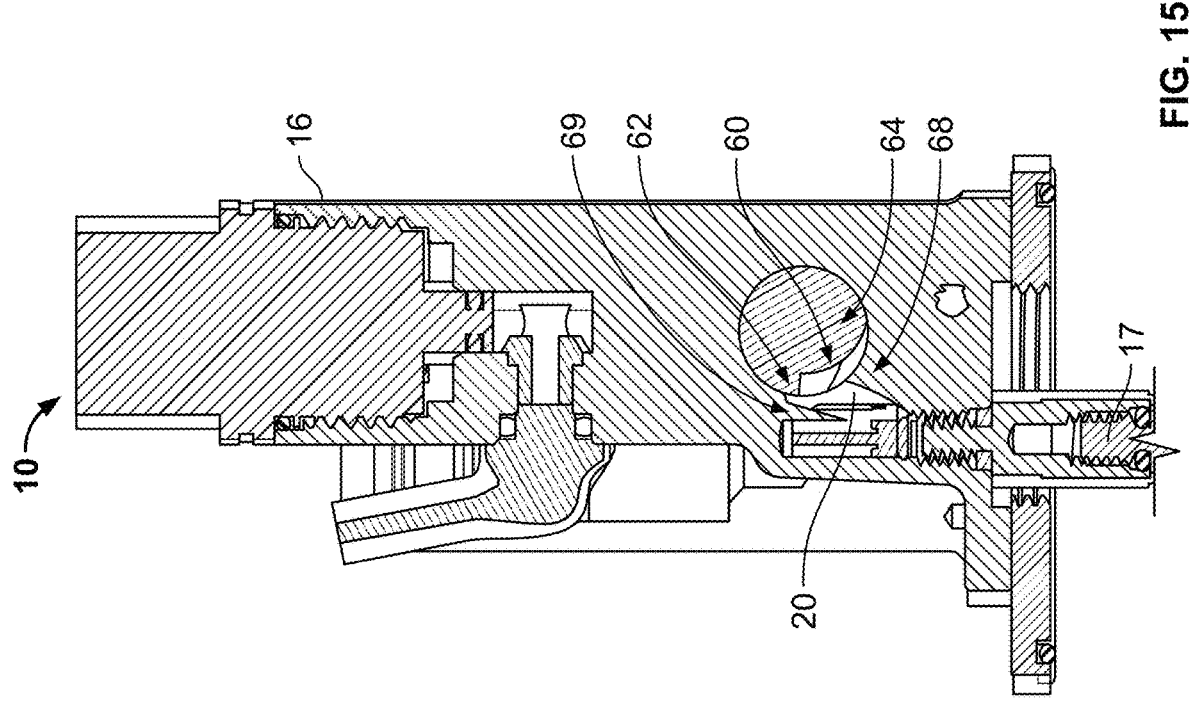
Figure 16:
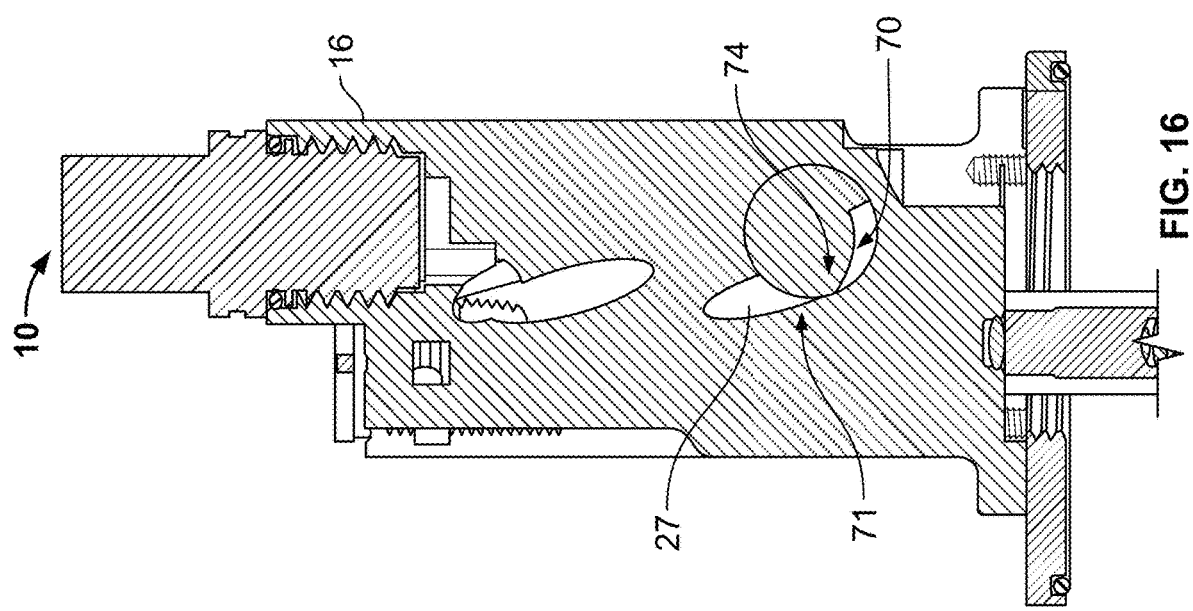

In exemplary embodiments, FIGS. 9 and 15-16 depict the positions of the handle member 13 and the mixing valve 42 when the handle member 13 and mixing valve 42 are positioned, moved or rotated in the full cold position.

In such a position and when actuating member 19 has been actuated, cold water from supply line 17 will enter cold water inlet 20. From cold water inlet 20 and as shown in FIG. 15, cold water will enter the cam portion 60 of cold water portion 48 of mixing valve 42, and then travel to mixing portion 52 of mixing valve 42. The cold water can then travel from the mixing portion 52 of mixing valve 42 to mixed water line 21 (FIG. 8), and then on to sensing region 24, and then to outlet 26.

As shown in FIG. 15, when the handle member 13 and mixing valve 42 are positioned in the full cold position, the recessed end 62 of cold water portion of mixing valve 42 is positioned proximal to an upper end 69 of cold water inlet 20 and the elevated end 64 of cold water portion 48 of mixing valve 42 is positioned a distance away from the lower end 68 of cold water inlet 20, thereby allowing a substantially full flow of cold water to enter cam portion 60 of cold water portion 48 of mixing valve 42 from inlet 20.

Referring to FIG. 16, when the handle member 13 and mixing valve 42 are positioned in the full cold position and when actuating member 19 has been actuated, hot water from supply line 15 will enter hot water inlet 18, travel through plunger region 29, and then travel to internal line 27. From internal line 27, hot water will be prevented from entering the cam portion 70 of hot water portion 50 of mixing valve 42 by upper surface 51. Thus, in the full cold position, the hot water is prevented from moving to the mixing portion 52 of mixing valve 42 and to mixed water line 21 (and thus prevented from exiting outlet 26).

Referring to FIG. 16, when the handle member 13 and mixing valve 42 are positioned in the full cold position, the elevated end 74 of hot water portion 50 of mixing valve 42 is positioned below or underneath a lower end 71 of internal line 27, thereby preventing hot water from line 27 from entering the cam portion 70 of hot water portion 50 of mixing valve 42 by upper surface 51.

Figure 8:
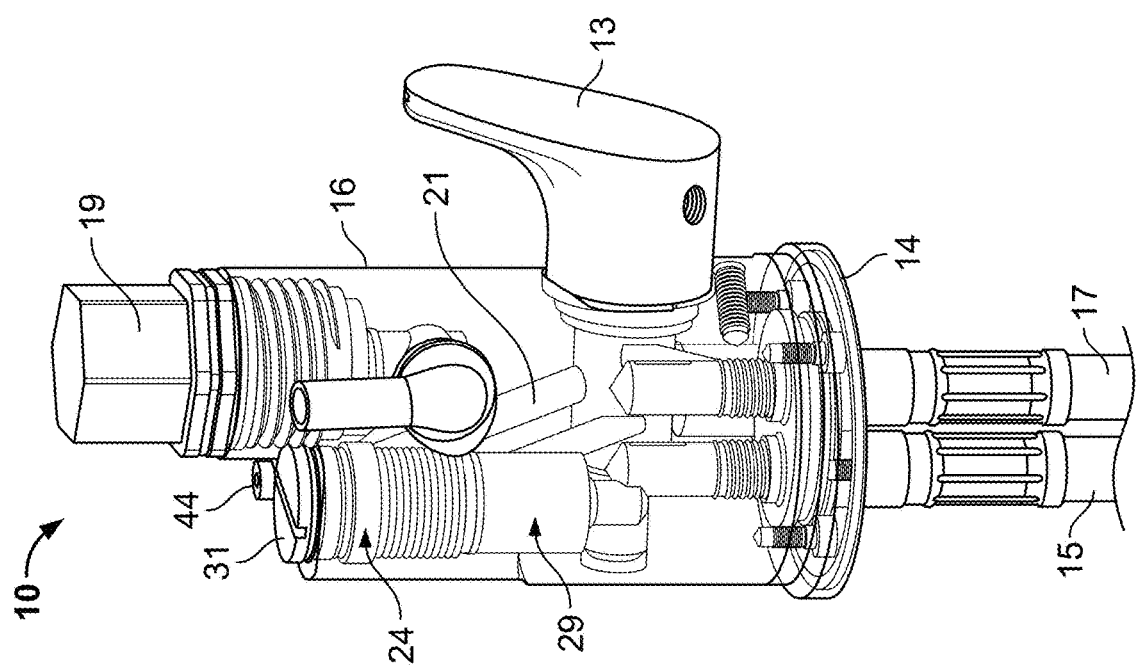
Figure 13:
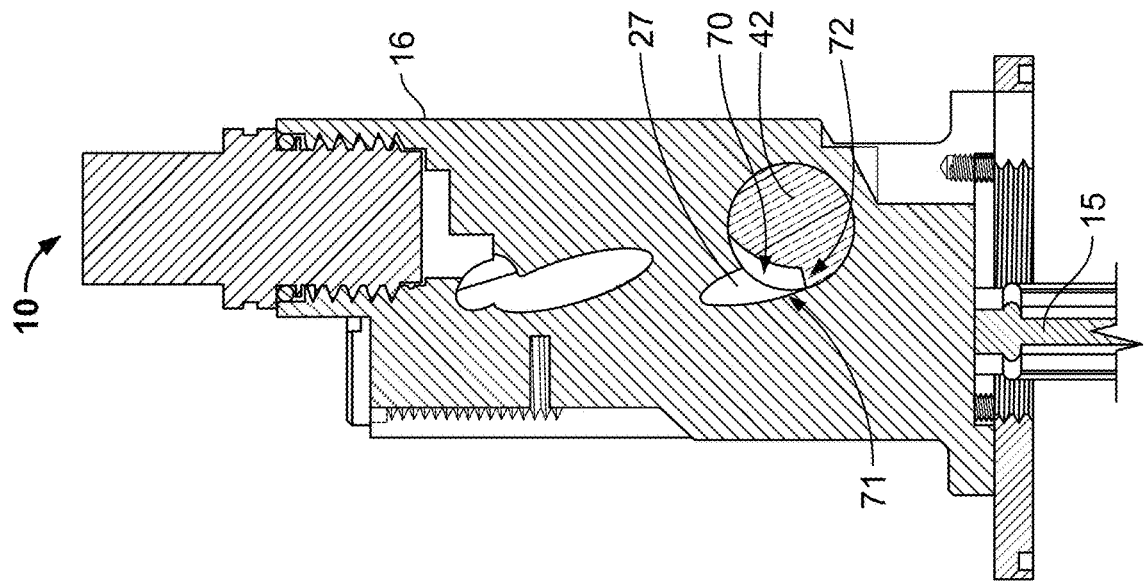
Figure 12:
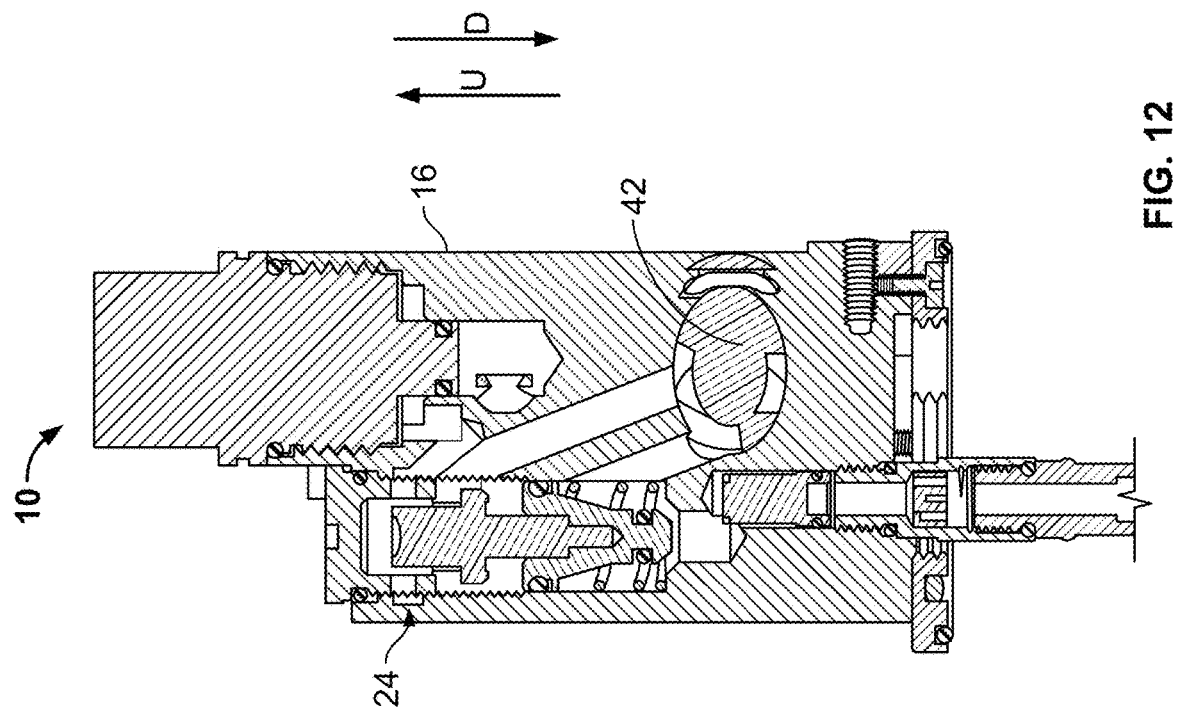
Figure 14:
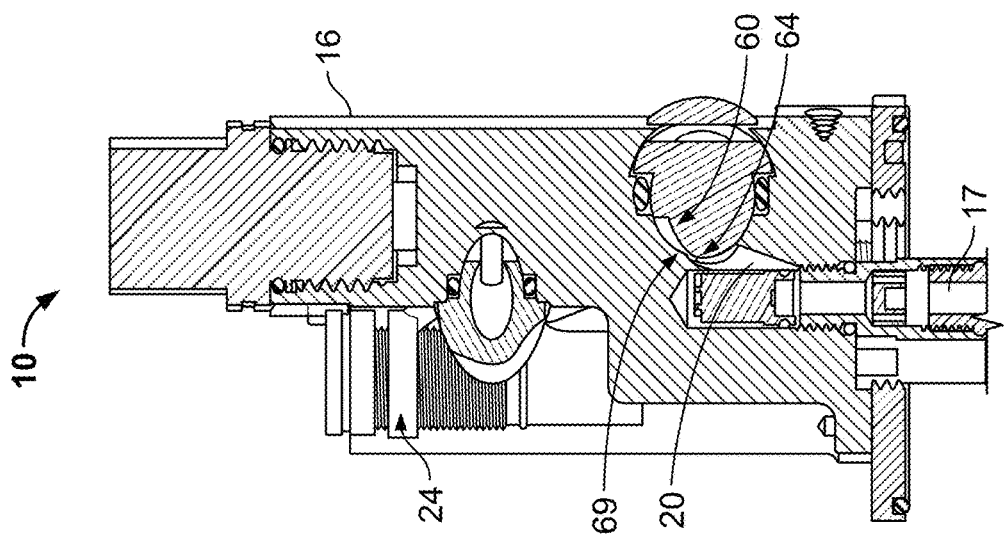

In exemplary embodiments, FIGS. 8 and 13-14 depict the positions of the handle member 13 and the mixing valve 42 when the handle member 13 and mixing valve 42 are positioned, moved or rotated in the full hot position, which includes some bleed flow of cold water into the mix water.

In such a position and when actuating member 19 has been actuated, cold water from supply line 17 will enter cold water inlet 20. From cold water inlet 20 and as shown in FIG. 14, some cold water will bleed into the cam portion 60 of cold water portion 48 of mixing valve 42, and then travel to mixing portion 52 of mixing valve 42. The cold water can then travel from the mixing portion 52 of mixing valve 42 to mixed water line 21, and then on to sensing region 24, and then to outlet 26.

As shown in FIG. 14, when the handle member 13 and mixing valve 42 are positioned in the full hot position, the elevated end 64 of cold water portion 48 of mixing valve 42 is positioned proximal to the upper end 69 of cold water inlet 20, thereby allowing a low flow of cold water to enter cam portion 60 of cold water portion 48 of mixing valve 42 from inlet 20.

In this way and as discussed above, when the mixing valve 42 is positioned in the full hot water position there is also a cold water path open to the thermal actuator 33 (e.g., via line 21 from mixing cavity 22 and from inlet 20). As such, in the event that the hot temperature limit is reached and the hot water is stopped by the anti-scald device/assembly 30 as discussed above, the cold water will continue to flow to the thermal actuator 33 and cool and contract the thermal actuator 33 and allow it to reset (e.g., move the plunger to the open position shown in FIGS. 11 and 18). Without such cold water flow to the thermal actuator 33, the thermal actuator 33 would, in a slower fashion, depend on the conductive cooling of its surroundings before the thermal actuator 33 could begin to operate again. And, even then and without such cold water flow to the actuator 33, the hot water immediately available to the thermal actuator 33 after such slower conductive cooling reset can, in a quicker fashion, cause the thermal actuator 33 to stop hot water flow again.

As shown in FIG. 13, when the handle member 13 and mixing valve 42 are positioned in the full hot position and when actuating member 19 has been actuated, hot water from supply line 15 will enter hot water inlet 18, travel through plunger region 29, and then travel to internal line 27. From internal line 27 and as shown in FIG. 13, hot water will enter the cam portion 70 of hot water portion 50 of mixing valve 42, and then travel to mixing portion 52 of mixing valve 42. The hot water can then travel from the mixing portion 52 of mixing valve 42 to mixed water line 21, and then on to sensing region 24, and then to outlet 26.

Referring to FIG. 13, when the handle member 13 and mixing valve 42 are positioned in the full hot position, the recessed end 72 of hot water portion 50 of mixing valve 42 is positioned below or underneath the lower end 71 of internal line 27, thereby allowing a substantially full flow of hot water to enter cam portion 70 of hot water portion 50 of mixing valve 42 from internal line 27.

As such and with reference to the discussion above relative to the various positions of the handle member 13 and mixing valve 42 in the neutral, full cold and full hot positions (and the various positions of the handle member 13 and mixing valve 42 between such positions), exemplary mixing valve 42 is advantageously configured to permit constant simultaneous adjustment of flows of both the hot and cold water inlets 18, 20 to mix to the desired outlet temperature through outlet 26. As such and using mixing valve 42 of assembly 10, the flow rate of mixed water through outlet 26 can stay more constant (e.g., as the cold flow is increased through inlet 20, the hot flow is decreased through inlet 18; as the hot flow is increased through inlet 18, the cold flow is decreased through inlet 20). As noted above, this is an improvement over conventional systems/methods of simply adjusting the cold water flow to control the outlet temperature. It is also an improvement over using and having to adjust two individual conventional flow control valves (e.g., an individual hot valve and an individual cold valve), as exemplary assemblies 10 may advantageously use the one mixing valve 42 to control the flow of both hot and cold water flows through inlets 18, 20.

Whereas the disclosure has been described principally in connection with advantageous fluid supply assemblies (e.g., water faucet assemblies) for domestic, commercial, industrial and/or recreational uses/purposes, such description has been utilized only for purposes of disclosure and is not intended as limiting the disclosure. To the contrary, it is to be recognized that the disclosed assemblies, systems and methods are capable of use for other uses/purposes (e.g., as other fluid supply assemblies for other fluid systems).

Although the assemblies, systems and methods of the present disclosure have been described with reference to exemplary embodiments thereof, the present disclosure is not limited to such exemplary embodiments and/or implementations. Rather, the systems, assemblies and methods of the present disclosure are susceptible to many implementations and applications, as will be readily apparent to persons skilled in the art from the disclosure hereof. The present disclosure expressly encompasses such modifications, enhancements and/or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure.

The invention claimed is:

1. A fluid supply assembly comprising:
a mixing valve housed in a mixing cavity; and
an anti-scald device housed in an anti-scald cavity, the anti-scald device comprising:
   a thermal actuator and a plunger, wherein the thermal actuator is configured to move the plunger to close a hot fluid inlet when a temperature of a mixed fluid flow, formed from hot fluid and cold fluid mixed in the mixing cavity, reaches a set-point temperature; and
   an adjustable cap member mounted to a first end of the anti-scald cavity and a stopper mounted to the first end of the anti-scald cavity;
   wherein the stopper is configured for stopping a motion of the cap member away from a second end of the anti-scald cavity, and the cap member is adjustable to move from the stopper toward the second end of the anti-scald cavity;
   wherein after the cap member is moved toward the second end of the anti-scald cavity, a set point temperature of a sensing region decreases; and
   wherein after the cap member is moved away from the second end of the anti-scald cavity, the set-point temperature of the sensing region increases.

2. The fluid supply assembly of claim 1, wherein the cap member is configured to be moved by rotating the cap member in a rotational direction perpendicular to the direction of the movement of the cap member away from the second end of the anti-scald cavity.

3. The fluid supply assembly of claim 1, further comprising a spring positioned against the second end of the anti-scald cavity and configured to provide a biasing force to the thermal actuator and the plunger member against the cap member and the stopper.

4. The fluid supply assembly of claim 1, wherein the assembly is configured such that moving the cap member causes the thermal actuator to be moved.

5. The fluid supply assembly of claim 1, wherein the stopper comprises a shoulder bolt.

6. The fluid supply assembly of claim 1, wherein the mixing valve is configured to be movable between a full-cold position and a full-hot position, wherein the full-hot position is a maximum hot position for the mixing valve.

7. The fluid supply assembly of claim 6, wherein the mixing valve is configured such that:
   when the mixing valve is in the full-cold position, the mixing valve is positioned such that a first amount of cold fluid flows from a cold fluid inlet into the mixing cavity; and
   when the mixing valve is in the full-hot position, the mixing valve is positioned such that a second amount of cold fluid, less than the first amount, flows from the cold fluid inlet into the mixing cavity.

8. The fluid supply assembly of claim 1, wherein the mixing valve is configured such that, when the hot fluid inlet is closed, cold water continues to flow to the thermal actuator to cool the thermal actuator to allow the thermal actuator to reset.

9. The fluid supply assembly of claim 1, wherein the mixing cavity is fluidly connected to a sensing region of the anti-scald cavity.

10. The fluid supply assembly of claim 9, wherein the hot fluid inlet is fluidly connected to the mixing cavity and a cold fluid inlet is fluidly connected to the mixing cavity, and wherein the mixing cavity is fluidly connected to the sensing region of the anti-scald cavity such that the mixed fluid flow formed from hot fluid and cold fluid travels through the sensing region of the anti-scald cavity and then out a mixed fluid outlet.

11. The fluid supply assembly of claim 1, wherein the mixing valve is a coupled mixing valve configured to simultaneously adjust flow of both the hot fluid and a cold fluid into the mixing cavity.

12. The fluid supply assembly of claim 1, wherein the mixing valve is a dual-cam mixing valve including a hot fluid cam portion and a cold fluid cam portion, the hot fluid cam portion elevating from a first recessed end to a first elevated end and the cold fluid cam portion elevating from a second recessed end to a second elevated end.

13. The fluid supply assembly of claim 1, wherein the thermal actuator is configured to expand to move the plunger to close the hot fluid inlet.

14. The fluid supply assembly of claim 1, wherein the plunger member fluidically separates a sensing region from a plunger region of the anti-scald cavity.

15. The fluid supply assembly of claim 1, wherein the thermal actuator comprises a wax member.

16. The fluid supply assembly of claim 1, wherein the mixing valve includes a shaft portion configured to mount to a handle member.

17. The fluid supply assembly of claim 1, wherein the cap member comprises a temperature adjustment screw.

18. The fluid supply assembly of claim 1, wherein the stop member is configured for stopping a linear motion of the cap member away from a second end of the anti-scald cavity.

* * * * *